(12) United States Patent
Brouk et al.

(10) Patent No.: US 10,836,580 B2
(45) Date of Patent: Nov. 17, 2020

(54) CONVEYOR CARTRIDGE WITH BRAKING MECHANISM

(71) Applicant: INTELLIGRATED HEADQUARTERS, LLC, Mason, OH (US)

(72) Inventors: Justin Brouk, Cincinnati, OH (US); Frederick F. Van Keuren, Batavia, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/270,294

(22) Filed: Feb. 7, 2019

(65) Prior Publication Data

US 2019/0308814 A1  Oct. 10, 2019

Related U.S. Application Data

(63) Continuation-in-part of application No. 15/946,772, filed on Apr. 6, 2018, now Pat. No. 10,239,696.

(51) Int. Cl.
*B65G 13/075* (2006.01)
*B65G 13/11* (2006.01)
*B65G 13/071* (2006.01)

(52) U.S. Cl.
CPC ............ *B65G 13/075* (2013.01); *B65G 13/11* (2013.01); *B65G 13/071* (2013.01);
(Continued)

(58) Field of Classification Search
CPC .... B65G 13/071; B65G 13/075; B65G 13/11; B65G 15/60; B65G 23/04; B65G 2205/04; B65G 2205/06; B65G 2207/30
See application file for complete search history.

(56) References Cited

U.S. PATENT DOCUMENTS 2,121,560 A   6/1938  Duncan
3,082,858 A   3/1963  King
(Continued)

FOREIGN PATENT DOCUMENTS

CN   104370062 A   2/2015
DE    2705500 A1   1/1978
(Continued)

OTHER PUBLICATIONS

Partial European Search Report for Application No. 19166915.7, dated Aug. 30, 2019, 14 pages.
(Continued)

*Primary Examiner* — Gene O Crawford
*Assistant Examiner* — Keith R Campbell
(74) *Attorney, Agent, or Firm* — Alston & Bird LLP

(57) ABSTRACT

A conveyor system comprising a conveyor cartridge removably coupled with a first side plate and an opposite second side plate that delimit a direction of the conveyor cartridge transverse to transport direction. Conveyor rollers rotatably mounted to axles and extending a conveyor roller width between the first side plate and the second side plate. Braking mechanism positioned internally in the cartridge frame in between the first side plate and the opposite second side plate. The braking mechanism abuts the conveyor rollers to retard rotation of the conveyor rollers.

27 Claims, 10 Drawing Sheets

(52) U.S. Cl.
CPC ...... *B65G 2205/04* (2013.01); *B65G 2205/06* (2013.01); *B65G 2207/30* (2013.01)

(56) References Cited

U.S. PATENT DOCUMENTS

| | | | |
|---|---|---|---|
| 3,180,472 A | | 4/1965 | Isacsson |
| 3,724,642 A | * | 4/1973 | De Good ............. B65G 13/075 198/781.06 |
| 3,944,054 A | | 3/1976 | Ensinger |
| 4,146,126 A | | 3/1979 | Mattos |
| 4,488,638 A | | 12/1984 | Morgan et al. |
| 4,646,885 A | | 3/1987 | Giardini |
| 4,712,965 A | | 12/1987 | Canziani |
| 5,174,435 A | | 12/1992 | Dorner et al. |
| 5,375,689 A | * | 12/1994 | Sapp ..................... B65G 13/075 193/35 A |
| 5,423,418 A | | 6/1995 | Furrow |
| 5,580,044 A | | 12/1996 | Wafler |
| 5,580,444 A | | 12/1996 | Burrows |
| 5,692,597 A | | 12/1997 | Ferguson |
| 6,523,664 B2 | | 2/2003 | Shaw et al. |
| 6,619,473 B2 | | 9/2003 | Romeo |
| 7,021,456 B2 | * | 4/2006 | Haan .................... B65G 13/075 193/35 A |
| 7,080,725 B2 | | 7/2006 | Hishinuma |
| 7,152,730 B2 | | 12/2006 | Gerke |
| 7,267,223 B2 | | 9/2007 | Spoors |
| 7,806,254 B2 | * | 10/2010 | Brayman ............... B65G 21/06 198/461.1 |
| 8,695,788 B2 | | 4/2014 | Lindemann |
| 9,156,627 B2 | * | 10/2015 | Mathi ................... B65G 13/073 |
| 9,233,803 B2 | | 1/2016 | Pilarz et al. |
| 9,415,937 B2 | | 8/2016 | Kupper et al. |
| 2007/0114861 A1 | * | 5/2007 | Bott ..................... H02K 1/2786 310/71 |
| 2010/0219050 A1 | | 9/2010 | Deyanov et al. |
| 2013/0327605 A1 | * | 12/2013 | Bachmaier ............. B60T 13/10 188/361 |
| 2014/0034457 A1 | | 2/2014 | Kliefoth Ruediger |
| 2014/0183002 A1 | | 7/2014 | Tully et al. |
| 2015/0166263 A1 | | 6/2015 | Collot et al. |

FOREIGN PATENT DOCUMENTS

| | | |
|---|---|---|
| DE | 202006017466 U1 | 9/2007 |
| EP | 2783819 A2 | 10/2014 |
| GB | 2023528 A | 1/1980 |
| JP | 04003705 A * | 1/1992 |

OTHER PUBLICATIONS

Extended European Search Report for Application No. 19166915.9, dated Nov. 7, 2019, 12 pages.

Flat Magnetic Slide conveyors | Goudsmit Magnetics [online] [retrieved Apr. 2, 2018]. Retrieved from the Internet: http://www.goudsmitmagnets.com/industrial-magnetic-systems/magnetic-handling/magneti . . . > (undated) 6 pages.

Conveyor Belt Replacement Procedure (Head Drive).wmv-YouTube [online] [retrieved Apr. 2, 2018]. Retrieved from the Internet: https://www.youtube.com/watch?v-x4s8QXKUkuw>. (dated Jan. 29, 2012) 2 pages.

A&D Inspection Simplified—Handy Hints Series—Change a conveyor Belt on A&D EZICheck Checkweigher—YouTube [online] [retrieved Apr. 2, 2018]. Retrieved from the Internet: https://www.youtube.com/watch?v-bgpHhWAEAAk>. (dated Feb. 25, 2016) 2 pages.

Intellectual Property Office, Great Britain Search Report for Great Britain Patent Application No. 1903976.7, dated Sep. 12, 2019, (5 pages), South Wales, United Kingdom.

Communication pursuant of Rules 70(2) and 70a(2) for European Application No. 19166915.9, dated Dec. 16, 2019.

Intention to Grant for Great Britain Patent Application No. 1903976.7 dated Jun. 15, 2020, 2 pages.

Non-Final Rejection dated Aug. 7, 2018 for U.S. Appl. No. 15/946,772.

Notice of Allowance and Fees Due (PTOL-85) dated Nov. 7, 2018 for U.S. Appl. No. 15/946,772.

U.S. Appl. No. 15/946,772, filed Apr. 6, 2018, now U.S. Pat. No. 10,239,696.

Office Action for Chinese Patent Application No. 201910269460.7 dated Jun. 28, 2020, 22 pages.

Office Action for Chinese Patent Application No. 201910229824.9 dated Aug. 20, 2020, 11 pages.

* cited by examiner

FIG. 2

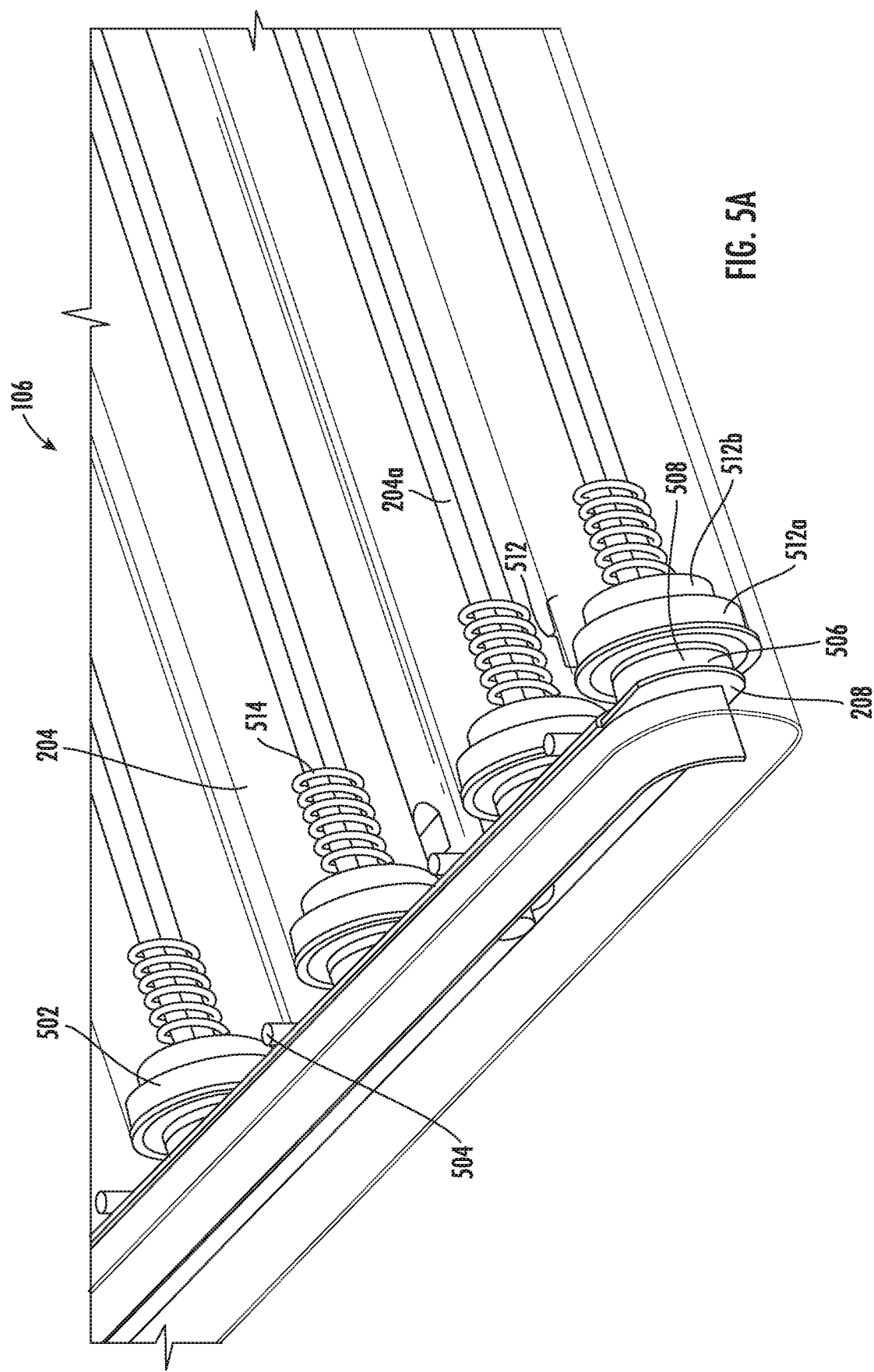

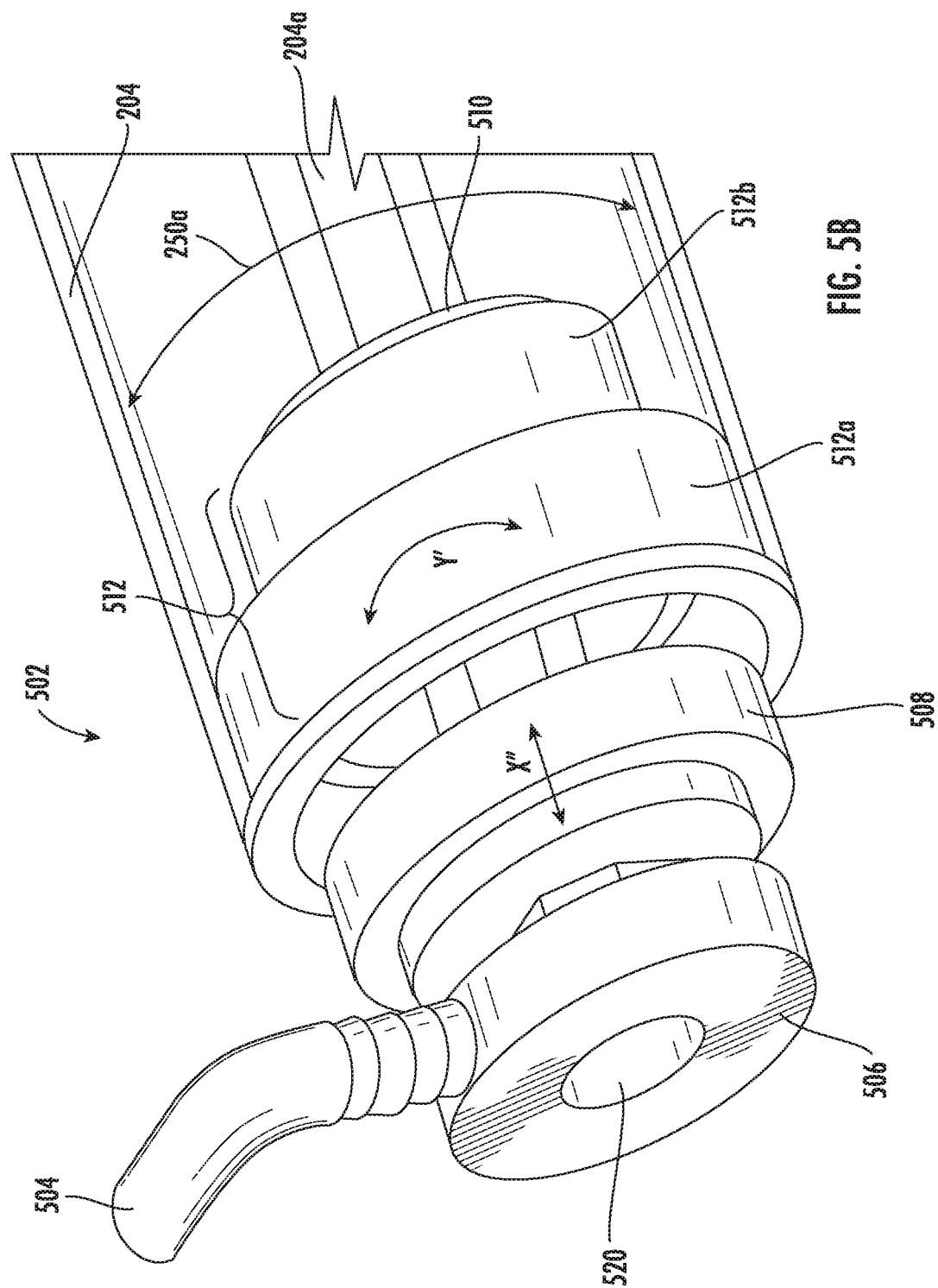

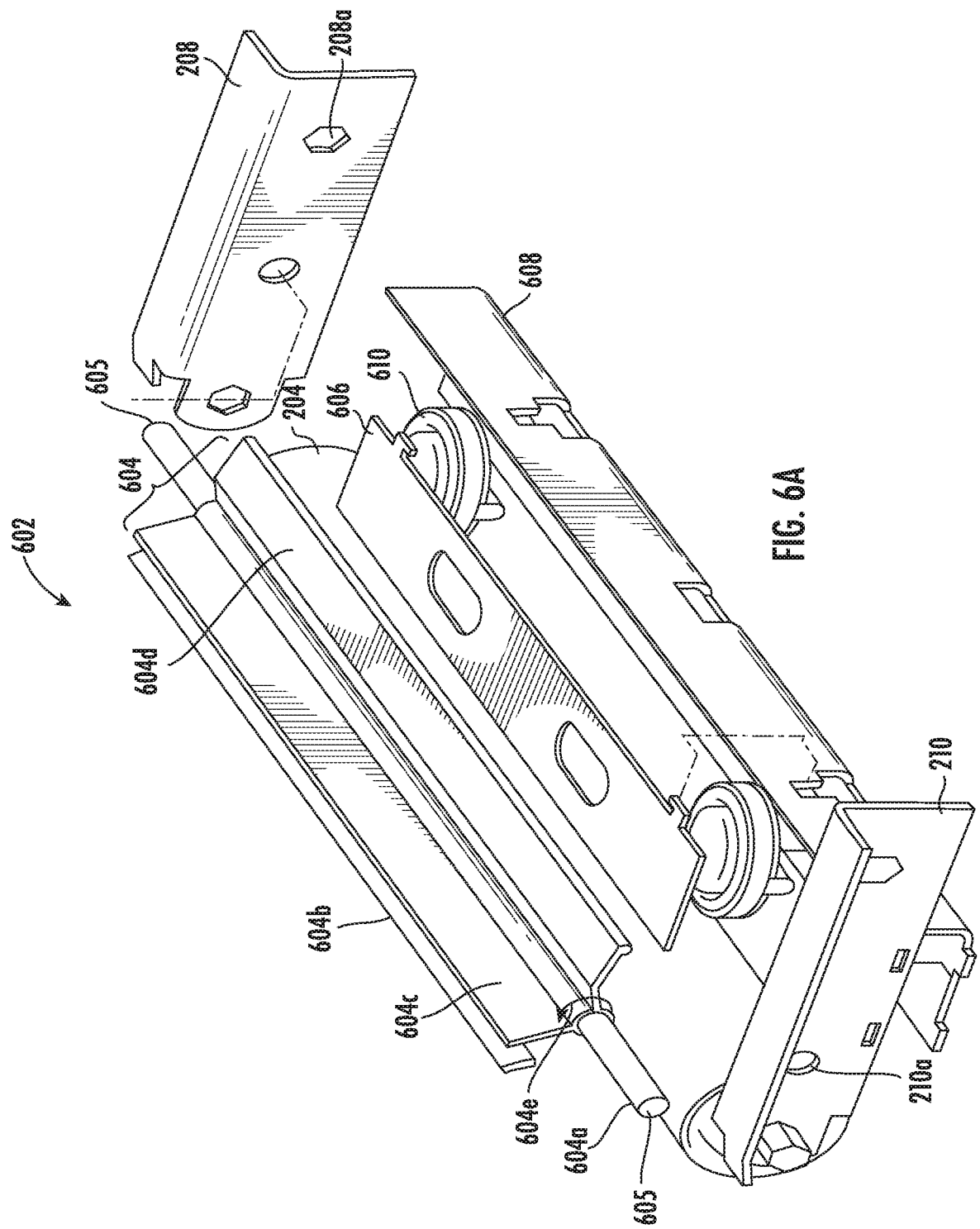

CONVEYOR CARTRIDGE WITH BRAKING MECHANISM

CROSS-REFERENCE TO RELATED APPLICATIONS

This application is a continuation-in-part of U.S. application Ser. No. 15/946,772, filed Apr. 6, 2018, the entire contents of which are incorporated herein by reference.

TECHNICAL FIELD

The present disclosure relates generally to braking mechanisms, and, more specifically, relates to a conveyor cartridge with one or more braking mechanisms.

BACKGROUND

Generally in roller conveyors, braking is provided for the purpose of controlling or retarding rotation of rollers on the roller conveyors. By retarding the rotation of the rollers, the movement of loads, such as articles, cartons or other packages, conveyed on these rollers may be controlled and manipulated in a desirable fashion. For example, in an accumulation conveyor, the braking of the rollers is controlled in a manner such that the loads on the rollers coast to a stop which results in accumulation of the loads at various tones of the accumulation conveyor. Further, such braking may also be incorporated in belt conveyors to retard a movement of a belt reeved around the rollers. Therefore, providing braking to the roller conveyors and belt conveyors aids in efficient accumulation and handling of loads transported on both the rollers and the belt. However, Applicant has identified a number of deficiencies and problems associated with the braking used in conjunction with the roller conveyors and belt conveyors. Through applied effort, ingenuity, and innovation, many of these identified problems have been solved by developing solutions that are included in embodiments of the present disclosure, many examples of which are described in detail herein.

BRIEF SUMMARY OF SOME EXAMPLE EMBODIMENTS

The following presents a simplified summary in order to provide a basic understanding of some aspects of the disclosed conveyor system. This summary is not an extensive overview and is intended to neither identify key or critical elements nor delineate the scope of such elements. Its purpose is to present some concepts of the described features in a simplified form as a prelude to the more detailed description that is presented later.

Various aspects described herein relate to a conveyor system. The conveyor system includes a conveyor frame with a first side rail and a second side rail. A conveyor cartridge removably coupled with the first side rail and a second side rail of the conveyor frame. The conveyor cartridge includes a cartridge frame. The cartridge frame includes a first side plate and an opposite second side plate that delimit a direction of the conveyor cartridge transverse to transport direction. Conveyor rollers rotatably mounted to axles and extending a conveyor roller width between the first side plate and the opposite second side plate. The conveyor cartridge further includes a braking mechanism positioned internally in the cartridge frame in between the first side plate and the opposite second side plate, wherein the braking mechanism abuts the conveyor rollers to retard rotation of the conveyor rollers.

Various aspects described herein relate to a conveyor system, wherein the cartridge frame includes two extended portions, each extended portion integrally formed on a top surface of one of the first side plate or the opposite second side plate. An arcuate sloped surfaces integrally formed on opposite end portions of each of the extended portions. The arcuate sloped surfaces are downwardly bowed on the opposite end portions to define a curved head portion and a curved tail portion for the extended portions. A belt slidably engaged to the cartridge frame fully covering the conveyor rollers and the braking mechanism and extending beyond the conveyor rollers to cover at least a portion of each of the extended portions.

Various aspects described herein relate to a conveyor system, wherein the one or more braking mechanism includes bladder and brake plates.

Various aspects described herein relate to a conveyor system, wherein the one or more braking mechanism includes magnets and brake pads.

Various aspects described herein relate to a conveyor system, wherein the one or more braking mechanism includes air diaphragms, cone brakes and bearings.

Various aspects described herein relate to a conveyor system, wherein the one or more braking mechanism includes an arm, support rod, and brake pad with two wings.

Various aspects described herein relate to a conveyor cartridge configured to be removably coupled with a first side rail and a second side rail of a conveyor frame. The conveyor cartridge includes a cartridge frame. The cartridge frame includes a first side plate and an opposite second side plate that delimit a direction of the conveyor cartridge transverse to transport direction. A braking mechanism positioned internally in the cartridge frame in between the first side plate and the opposite second side plate. The brake pad abuts the conveyor rollers to instantly retard rotation of the conveyor rollers.

Various aspects described herein relate to a conveyor cartridge in which the braking mechanism includes a brake pad, a brake pad shaft, a spring and a first set of magnets.

Various aspects described herein relate to a conveyor cartridge with extended portions, each extended portion integrally formed on a top surface of one of the first side plate or the opposite second side plate and arcuate sloped surfaces integrally formed on opposite end portions of each of the extended portions. A belt slidably engaged to the cartridge frame covering the conveyor rollers and the braking mechanism and extending beyond the conveyor rollers to cover at least a portion of each of the extended portions.

Various aspects described herein relate to a conveyor cartridge with a magnet mount attached to the conveyor frame comprising a second set of magnets with like polarity as that of the first set of magnets. The conveyor frame has a first side rail and a second side rail and the conveyor cartridge is removably coupled with the first side rail and the second side rail of the conveyor frame. An actuating puck to lift the magnetic mount in a vertical direction towards and away from the conveyor cartridge.

Various aspects described herein relate to a conveyor system, wherein the brake pad shaft is coupled an axle of a conveyor roller, and the spring is wound over the brake pad shaft.

Various aspects described herein relate to a conveyor system, wherein the actuating puck is an air diaphragm.

Various aspects described herein relate to a conveyor system, wherein when the actuating puck is deflated, the magnetic mount is moved away from the conveyor rollers and the brake pad of each conveyor roller makes a contact with the inner circumferential portion of the conveyor roller.

Various aspects described herein relate to a conveyor cartridge in which the braking mechanism comprises an air inlet valve, an air diaphragm, a cone brake, a bearing, and a bearing housing.

Various aspects described herein relate to a conveyor cartridge, wherein the bearing housing comprises a first portion and a second portion and is installed with a clearance with respect to axles of the conveyor rollers, and wherein the second portion holds the bearing.

Various aspects described herein relate to a conveyor cartridge, wherein the cone brake is attached to an axle of a conveyor roller such that the cone brake slides axially along the axle in a direction "x" opposite to a direction of rotation "y" of the conveyor roller.

Various aspects described herein relate to a conveyor cartridge, wherein the cone brake slides on an axle from an initial rest position to a braking position in the direction "x", wherein at the initial rest position, the cone brake is free from contact with the bearing housing, and wherein at the braking position, the cone brake and contacts the bearing provided on the bearing housing.

Various aspects described herein relate to a conveyor in which the braking mechanism comprises a bladder, one or more brake plates, an air inlet valve and an apertured axle.

Various aspects described herein relate to a conveyor cartridge, wherein the apertured axle includes one or more apertures, wherein the bladder inflates when air flows through the one or more apertures into a vacuum that is defined by the bladder and the apertured axle.

Various aspects described herein relate to a conveyor cartridge, wherein the one or more brake plates contact the inner circumferential portion of the conveyor roller in response to an inflation of the bladder.

Various aspects described herein relate to a conveyor cartridge in which the braking mechanism comprises an arm, an isolation plate, an actuator base and one or more actuators. The arm includes a support rod, a brake pad, a first wing and second wing.

Various aspects described herein relate to a conveyor cartridge, wherein one end of first wing is attached to the brake pad and one end of the second wing is positioned above the isolation plate with a clearance therebetween Various aspects described herein relate to a conveyor cartridge, wherein the support rod is inserted into a through hole provided in the arm centered between the first wing and the second wing.

Various aspects described herein relate to a conveyor cartridge, wherein the one or more actuators is positioned on the actuator base, and wherein the actuator base extends a conveyor cartridge width from the first side plate to the opposite second side plate.

Various aspects described herein relate to a conveyor cartridge, wherein the first wing and the second wing are arranged in the form of a seesaw with the support rod centered therebetween.

Various aspects described herein relate to a conveyor cartridge, wherein the one or more actuators inflate and lift the isolation plate from its original position in a vertical direction such that it contacts the second wing.

Various aspects described herein relate to a conveyor cartridge, wherein the brake pad on the first wing provides a pressing contact with the conveyor roller to instantly stop a rotation of the conveyor roller.

Various aspects described herein relate to a conveyor cartridge removably coupled with the first side rail and a second side rail of the conveyor frame. The conveyor cartridge includes a cartridge frame. Conveyor rollers rotatably mounted to axles having one or more apertures and extending a conveyor roller width between a first side plate and a second side plate. A braking mechanism positioned internally in the cartridge frame in between the conveyor rollers. The braking mechanism abuts the conveyor rollers to retard rotation of the conveyor rollers.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 illustrates an exploded view of a conveyor cartridge, such as the conveyor cartridge shown in FIG. 1, in accordance with one or more embodiments of the present disclosure.

FIG. 5A illustrates another example braking mechanism used within a conveyor cartridge, in accordance with one or more embodiments of the present disclosure.

FIG. 5B illustrates braking mechanism of FIG. 5A shown in an exploded view, in accordance with one or more embodiments of the present disclosure.

FIG. 6A illustrates yet another example braking mechanism shown in an exploded view and used within the conveyor cartridge of FIG. 2, in accordance with one or more embodiments of the present disclosure.

DETAILED DESCRIPTION

Figure 1:
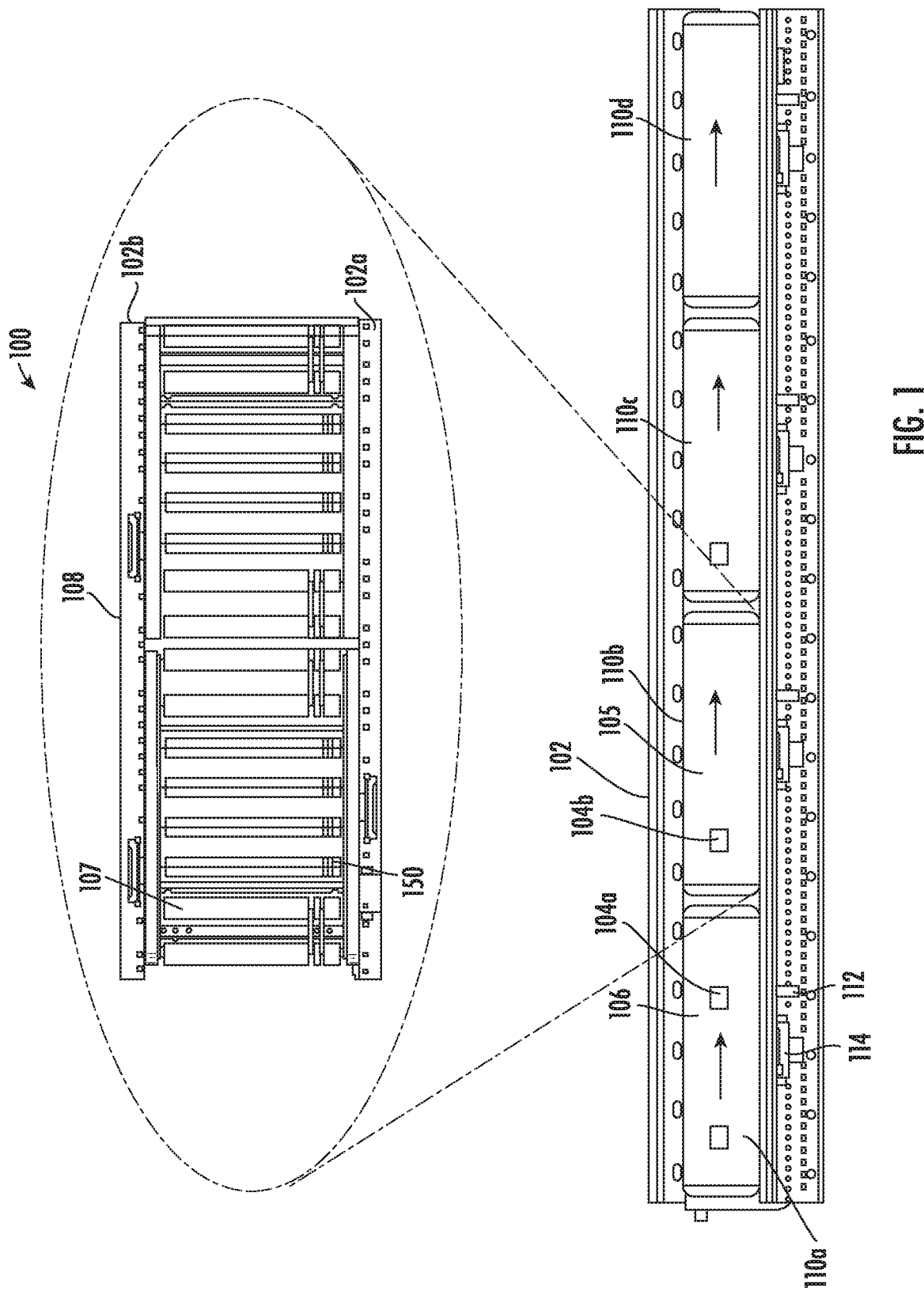
FIG. 1 illustrates a top view of a conveyor cartridge with an example braking mechanism, in accordance with one or more embodiments of the present disclosure.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various elements are described which may be present for some embodiments but not other embodiments.

It is understood that the use of specific component, device and/or parameter names and/or corresponding acronyms thereof, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which a different element, feature, protocol, or concept name is utilized. Thus, each term utilized herein is to be given its broadest interpretation given the context in which that terms is utilized.

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms "substantially" and "approximately" are used herein to refer to within engineering and/or manufacturing standards.

As used herein, the terms "conveyor section," "conveyor bed," "conveyor assembly/system," and similar terms may be used interchangeably to refer to a conveyor capable of conveying articles within a material handling system in accordance with embodiments of the present disclosure. Thus, use of any such terms should not be taken to limit the spirit and scope of embodiments of the present disclosure.

As used herein, the terms "belt," "slidable/sliding belt," "elastic belt," "stretchable belt" and similar terms may be used interchangeably to refer to a belt made of high modulus material which may stretch due to its elastic properties when slid over conveyor cartridge frame in accordance with embodiments of the present disclosure. Thus, use of any such terms should not be taken to limit the spirit and scope of embodiments of the present disclosure.

The word "exemplary," when used herein, is intended to mean "serving as an example, instance, or illustration." Any implementation described herein as "exemplary" is not necessarily preferred or advantageous over other implementations.

In some examples of a conveying system, braking is provided to particular zone or zones of the conveyor bed to slow or stop the movement of the conveyor system using one or more techniques. One such technique to accomplish braking is to control a Motor Driven Roller (MDR) of a particular zone, for example, by switching the MDR from an ON state to an OFF state results in the rotation of all of rollers in that particular zone of the conveyor bed to be stopped. Another technique to accomplish braking is to move a conveyor drive belt towards and away from the rollers of the particular zone, for example, in an instance in which the conveyor drive belt moves away from the rollers, the rotation of the rollers in that particular zone is stopped.

In both these techniques of braking however, articles traveling on the rollers in a particular zone do not stop when braking is applied, but instead the articles continue to coast. For example, when the MDR goes to the ON state from the OFF state, the driving force is removed. In such cases, the MDR persists to rotate for a certain amount of time and, in turn, results in the continued rotation of the rollers of the particular zone. Therefore, the amount of time required for all of the rollers of the particular zone to stop their rotation may be considered as a threshold time taken by the rollers to approach a zero angular velocity. During this threshold time, the articles traveling on the conveyor bed may coasted a certain distance.

However, in some examples, coasting articles may lead to collision of the articles, such as fragile articles, against other articles of a neighboring zone. In some examples, articles may be damaged. Further, coasting articles may be undesirable in some situations, such as in situations where a maintenance activity is to be conducted on a particular zone as the articles must be manually removed from the particular zone.

Various example embodiments of the present disclosure relate to a conveyor cartridge having a braking mechanism. In some examples, the conveyor cartridge is removably coupled with a first side rail and removably coupled with a second side rail of a conveyor frame. The conveyor cartridge, in some examples, includes a cartridge frame, conveyor rollers, braking mechanism and a belt. The braking mechanism is positioned internal to the conveyor cartridge to retard a rotation of the conveyor rollers at any given point of time. In some example embodiments, the braking mechanism may be provided on an inner periphery of one or more of the rollers of the conveyor cartridge. Further, in some example embodiments, the braking mechanism may be provided on all of the rollers of the conveyor cartridge. In addition, and in some example embodiments, the braking mechanism may also be provided in between each of the conveyor roller of the conveyor cartridge. In some examples, the braking mechanism may include brake pads, cone brakes, magnets, air inlet valves, air bladders and diaphragms.

In some example embodiments, the cartridge frame includes a first side plate and an opposite second side plate that delimit a direction of the conveyor cartridge transverse to a transport direction of the conveyor cartridge. Further, the cartridge frame includes an extended portion integrally formed on a top surface of both the first side plate and the second side plate extending beyond the first side plate and the second side plate in the direction transverse to the transport direction.

In some example embodiments, an arcuate sloped surface is integrally formed on opposite end portions of the extended portion. The arcuate sloped surface is downwardly bowed, in some examples, on the opposite end portions to define a curved head portion and a curved tail portion for the extended portion.

In some example embodiments, conveyor rollers on the cartridge frame are installed between the first side plate and the second side plate. The belt is slidably engaged to the cartridge frame, such that and in some examples, it fully covers the conveyor rollers and may extend beyond the conveyor rollers. For example, the belt may cover at least a portion and/or all of the extended portion of the top surface of both the first side plate and the second side plate.

In some example embodiments, the conveyor cartridge is installable on the conveyor frame and the axles of the conveyor rollers are seated on axle retaining members provided on the first side rail and the second side rail of the conveyor frame.

In some examples, and based on the conveyor cartridge described herein, when the operator needs to stop the conveyor rollers of a particular zone, the braking mechanism of that particular zone may be enabled to stop the articles travelling on the conveyor cartridge so as to prevent the articles from coasting to neighboring zones and colliding with any fragile articles in the neighboring zone.

In addition, and in some example embodiments, the conveyor cartridge as a whole may be lifted or otherwise removed from the conveyor system. That is, the cartridge frame, along with the conveyor rollers, the braking mechanism and the belt may be removed as a single unit from the axle retaining members of the conveyor frame.

Further and in some example embodiments, the arcuate sloped surface of the extended portions extending or protruding out from both side plates of the conveyor cartridge frame facilitate, in some examples, in easy or otherwise advantageous removal and reinsertion of the belt from the conveyor rollers.

FIG. 1 illustrates a top view of a conveyor cartridge with an example braking mechanism in accordance with one or more embodiments of the present disclosure. As seen in FIG. 1, the conveyor frame 102 includes a first side rail 102a and a second side rail 102b. The conveyor cartridge 106 is removably coupled with the first side rail 102a and the second side rail 102b of the conveyor frame 102.

In some examples, a conveyor cartridge 106 is dedicated to a particular zone of a conveyor system 100. Each conveyor cartridge 106 of each zone may include a braking mechanism, such as the breaking mechanism shown in FIGS. 1 to 3D. In another example, conveyor cartridge 106 of each zone may include alternative braking mechanisms, such as the breaking mechanisms shown in FIGS. 4A to 6B. Alternatively or additionally, conveyor cartridge 106 may include a combination of breaking mechanisms, such as a combination of the one or more braking mechanisms shown in FIGS. 1 to 6B.

The braking mechanisms, as are shown in detail in conjunction with FIGS. 1 to 6B, facilitate, in some examples, a stop of articles 104 in each zone rather than a coast to stop. For example, in coast to stop concept, the articles 104 travel a certain distance on each zone before attaining zero acceleration and/or otherwise stopping. However, stop of articles 104, such as the stop of articles by the braking mechanisms described herein, may be required in certain circumstances in order to avoid article to article collision and during a maintenance of the conveyor cartridge 106. Further, and in some examples of the present disclosure, maintenance may be performed for each zone in a reduced time given that articles can be stopped in a given zone. For example, when the maintenance is performed on a particular zone from among the other zones of the conveyor system 100, the conveyor cartridge 106 of the particular zone may be removed and easily replaced by a substitute conveyor cartridge without shutting down or otherwise halting the conveyor system 100.

In the illustrated embodiment of FIG. 1, the conveyor system 100 is shown with four zones 110a, 110b, 110c and 110d, although, in other example embodiments, the conveyor system 100 may comprise more than four zones and or fewer than three zones. Each zone comprising, in some examples, a conveyor cartridge 106 with one type of braking mechanism 150 installed therein. Each zone may include article sensors 112 and their respective drive electronics or drive card 114 to drive a belt 105 of the conveyor cartridge 106 along a transport direction indicated by arrow 222. For example, a drive cable (not shown) of the conveyor cartridge 106 installed in a first zone 110a may be operatively attached and/or secured to the drive electronics and/or drive card 114 corresponding to the first zone 110a. The article sensors 112 include photo-eye sensors positioned at a downstream end of a respective zone and operable to detect the articles 104 as they move from the downstream end of one zone to the upstream end of the next, adjacent zone.

The term "upstream end" is used herein to refer an end portion of the conveyor system located proximate to the upstream direction. The term "upstream direction" is used herein to refer to a direction opposite of the transport direction. The term "downstream end" is used herein to refer an end portion of the conveyor system located proximate to the downstream direction. The term "downstream direction" is used herein to refer the transport direction of the articles conveyed on the conveyor system. The term "transport direction" is used herein, in some examples, to refer to a direction of travel of the articles 104 on the conveyor system from a source to a destination.

According to an embodiment, the conveyor cartridge 106 may include a drive conveyor roller 107 which may be selectively activated or deactivated by the drive electronics or drive card 114 of the particular zone in response to inputs from corresponding article sensors 112, or in response to more than one of the article sensors 112. According to an embodiment, the braking mechanisms may also be selectively activated or deactivated by the drive electronics or drive card 114 of the particular zone in response to inputs from corresponding article sensors 112, or in response to more than one of the article sensors 112 positioned along the conveyor system 100.

The drive conveyor roller 107 may drive other conveyor rollers 108 to rotate the belt 105 (or to cease and/or stop rotating the belt 105) in order to move or stop an article or articles 104 that is/are present on top of the belt 105 on that particular zone. The drive conveyor rollers 107 thus may be directly driven and operable to selectively and independently convey or accumulate one or more articles 104 on associated conveyor zones in response to one or more of the article sensors 112 and/or a signal provided to the drive electronics and/or drive card 114 by one or more of the article sensors 112.

In some embodiments, the example braking mechanisms disclosed herein may be operable to selectively and/or independently convey and stop articles 104 on the associated conveyor zones in response to one or more of the article sensors 112 and/or a signal provided to the drive electronics and/or drive card 114 by one or more of the article sensors 112. According to an embodiment, based on the signal provided by the article sensors 112, the drive electronics and/or drive card 114 may be provide with decision making capabilities to either operate the drive conveyor roller 107 or the braking mechanisms to either perform a "coast to stop" function or an "stop" function.

In some examples and when operating in "coast to stop mode", accumulation of articles 104 begins in an instance in which the photo eye 112 in Zone 110a detects the first article 104a and turns off the drive conveyor roller 107 in Zone 110a, stopping all the other conveyor rollers 108 in that zone. In an instance in which a second article 104b is detected by the photo eye 112 in Zone 110b, the drive conveyor roller 107 in Zone 110b is turned off, stopping all the other conveyor rollers 108 in that zone, wherein Zone 110b is the zone adjacent to and upstream of Zone 110a. In an instance in which the zones are turned off, articles 104 on the particular zone tends to coast a certain distance before attaining a complete stop. In some examples, coasting results in accumulation of articles 104 in each zone and subsequent zones. For example, the articles 104 may coast from one zone to the next downstream zone. This accumulation sequence is repeated for each succeeding zone. In this manner, one or more articles 104 may be accumulated in several conveyor sections of the conveyor system 100. In some examples, a conveyor section may include multiple zones. When the articles in Zone 110a can be released, the drive conveyor roller 107 is turned on and the articles 104 moves down to the downstream zone adjacent to Zone 110a. When the articles 104 clears the photo eye 112 in Zone 110a, the drive conveyor roller 107 in Zone 110b is turned on and the articles 104 from Zone 110b move downstream. In this manner, one or more articles 104 may be moved into subsequent zones on the conveyor system 100.

In another example when operating in a "stop" mode, accumulation of the articles 104 begins when the first article 104a is forced to remain in Zone 110a. When the photo eye 112 in Zone 110a detects the first article 104a, the drive electronics and/or drive card 114 activates the braking mechanism 150 of Zone 110a resulting in an stop of the first article 104a without coasting to the next downstream zone. When the second article 104b is detected by the photo eye 112 in Zone 110b, the drive electronics and/or drive card 114 activates the braking mechanism 150 of Zone 110b, which results in stopping of the second article 104b without coasting to the next downstream zone, wherein Zone 110b is the zone adjacent to and upstream of Zone 110a. This accumulation sequence is repeated for each succeeding zone as long as the first article 104a in Zone 110a is forced to remain in position without coasting.

In an instance in which the first article 104a in Zone 110a can be released, the braking mechanism 150 is deactivated and the first article 104a moves down to the downstream zone adjacent to Zone 110a. When the first article 104a clears the photo eye 112 in Zone 110a, the drive conveyor roller 107 in Zone 110b is turned on and the second article 104b moves from Zone 110b downstream. In this manner, one or more articles 104 may be stopped in each zone and may be moved into subsequent zones on the conveyor system 100 with adequate gaps therebetween the articles 104 of each zone and the adjacent zones. Providing the braking mechanism 150 in each conveyor cartridge 106 facilitates, in some examples, stopping of the articles 104 traveling on each zone without coasting to the neighboring zone and, in some examples, without contacting a downstream article.

The conveyor cartridge 106 with first example of braking mechanism as shown in the breakout view in FIG. 1 will be described further in detail in conjunction with FIGS. 2 to 3D. Alternative and/or additional types of braking mechanism will be described in detail in conjunction with FIGS. 4-6B.

Figure 2:
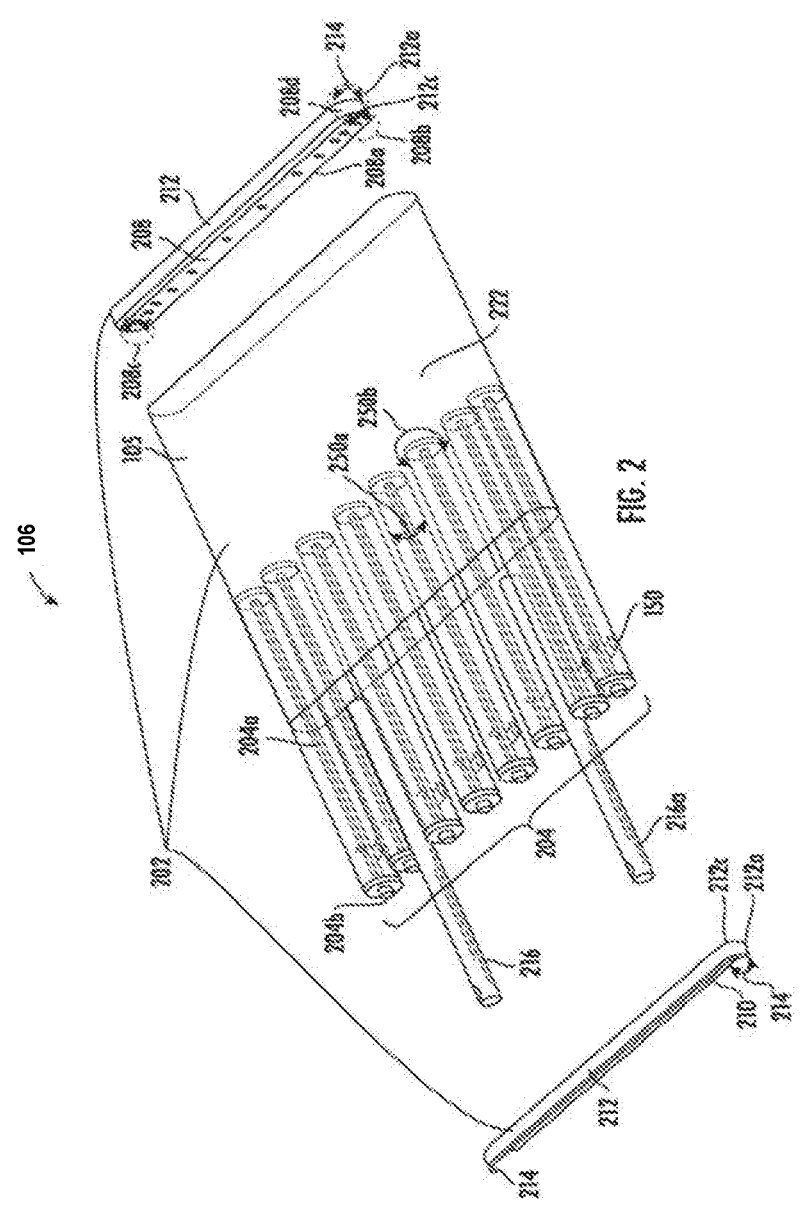

FIG. 2 illustrates an exploded view of a conveyor cartridge, as is shown in FIG. 1, in accordance with one or more embodiments of the present disclosure. The conveyor cartridge 106 represents a section or a zone of a conveyor system, and multiple such sections or zones may be connected together, directly, or with conveyor sections of other configurations interposed therebetween. The conveyor cartridge 106 includes a cartridge frame 202, conveyor rollers 204, braking mechanism 150, and belt 105. The conveyor rollers 204 may include the drive conveyor roller 107 and other conveyor rollers 108. The cartridge frame 202 includes a first side plate 208 and an opposite second side plate 210, one or more extended portions 212, each of the one or more extended portions 212 corresponding to one of the first side plate 208 or the second side plate 210, and one or more arcuate sloped surfaces 214, each arcuate sloped surface 214 corresponding to one of the first side plate 208 or the second side plate 210.

According to an embodiment, the first side plate 208 and the opposite second side plate 210 are a pair of spaced apart generally and/or approximately parallel frame rails, which carry a plurality of spaced apart apertures 208a, 210a (not shown) to receive the set of conveyor rollers 204. Although the first side plate 208 and the opposite second side plate 210 are illustrated as generally straight, examples of the present disclosure may be practiced with curved side plates conveying articles in the transport direction as indicated by arrow 222. As seen in FIG. 2, the first side plate 208 and an opposite second side plate 210 includes the plurality of spaced apart apertures 208a, 210a (not shown) to hold the set of conveyor rollers 204. According to an embodiment, each of the spaced apart apertures 208a, 210a (not shown) may be shaped complementarily to supporting ends 204b of each conveyor roller 204. As seen in FIG. 2, the supporting ends 204b of each conveyor roller 204 are disposed in corresponding spaced apart apertures 208a, 210a (not shown), such that the conveyor roller 204 extends in a direction that is generally and/or approximately perpendicular to the transport direction of the articles as indicated by arrow 222. The supporting ends 204b of each conveyor roller 204 are the end parts of each of the corresponding axles 204a that are ducted into each conveyor roller 204 to support the corresponding conveyor roller 204 on to the first side plate 208 and second side plate 210. The conveyor rollers 204 are rotatably mounted to the axles 204a and extends a conveyor roller width between the first side plate 208 and the second side plate 210. Each axle 204a, for example, may be of hexagonal shape and may be received in the spaced apart apertures 208a, 210a (not shown) of hexagonal shape. Further, the first side plate 208 and the second side plate 210, each of which includes opposite end portions 208b, 208c and 210b, 210c (not shown) having a curved outer periphery 208d, 210d (not shown). For example, the opposite end portions 208b, 208c and 210b, 210c are parts of the side plates 208, 210 located at opposite extreme ends along a longitudinal length of the side plates, wherein each part is a mirror image of one another. The curved outer periphery 208d, 210d (not shown) is the mirror imaged part provided at the opposite extreme ends of the side plates 208, 210.

According to an example embodiment, one or more connecting rods 216 mechanically couple the first side plate 208 and the second side plate 210 together. The one or more connecting rods 216 are cylindrical rods having a rigid structure and that are non-rotatable with respect to the first side plate 208 and the second side plate 210 when installed therein. The one or more connecting rods 216 include supporting ends 216a mechanically coupled to the first side plate 208 and the second side plate 210 through hex nuts and washers and/or other mechanical fasteners. According to an embodiment, the one or more connecting rods 216 may be secured to the cartridge frame 202 in between the conveyor rollers 204.

According to an example embodiment, the conveyor rollers 204 may include motor driven roller and idler rollers. The motor driven roller may be coupled to a corresponding electric motor (not shown) for driving the idler rollers. The motor driven conveyor rollers, for example, may include a DC brushless motor and may be operable at varying speeds to output varying torque to the motor driven conveyor roller. According to an embodiment, the axles 204a of end conveyor rollers 204d may be seated on the spaced apart apertures 208a, 210a (not shown) of the first side plate 208 and the second side plate 210 and may extend beyond the spaced apart apertures 208a, 210a (not shown) to make a contact with the axle retaining members (not shown). Although shown as having multiple conveyor rollers 204 spread along the cartridge frame 202, examples of the present disclosure may also include a support plate, a slider pan, or slider bed (not shown) between the conveyor rollers 204 and the slider bed and/or the like (not shown) may support the belt 105, without affecting the scope of the present disclosure.

According to an embodiment, the slider bed and/or the like (not shown) may comprise separate plates positioned between two consecutive conveyor rollers or may comprise a plate having multiple slots or openings therethrough for the conveyor rollers to protrude upward partially through the opening and provide rolling support for the articles along the slider bed and/or the like (not shown), without affecting the scope of the present disclosure. For example, the first side plate 208 and the second side plate 210 of the cartridge frame 202 may include dedicated apertures to receive the slider bed and/or the like in addition to the conveyor rollers 204.

According to an embodiment, the belt 105 is an elastic stretchable belt comprised of a high modulus material such as a rubber or other rubberlike material. As seen in FIG. 2, the belt 105 may be wide enough to cover a full width of the conveyor rollers 204. For example, the full width of the conveyor rollers 204 refers to a width of the conveyor rollers 204 including the axles 204a protruding out from each of the conveyor rollers 204. Thereby, the belt 105 provides a wide conveying surface for conveying articles along the belt 105 in the transport direction indicated by arrow 222.

In some examples, the belt 105 may be initially stretched and slid around the cartridge frame 202, such that the belt 105 has an initial stretch and continues to stretch in a lengthwise direction at the a top parallel to the transportation direction 222 when slid around the conveyor rollers 204. The belt 105 provides a substantially greater amount of stretch over conventional strip belts or conveyor belts, which may substantially cover only the generally cylindrical roller portions of the conveyor rollers 204. Moreover, the belt 105 may provide a surface area to act as a carrier 114 than conventional strip belts or conveyor belts. The belt 105 is slidably engaged to the cartridge frame fully covering the conveyor rollers 204 and the braking mechanism 150 and extends beyond the conveyor rollers 204 covering at least a portion of each of the extended portions 212.

According to an example embodiment, one or both of the first side plate 208 and the second side plate 210 includes an extended portion 212. In an example embodiment, the extended portion 212 is integrally formed on a top surface 208e of one or both of the first side plate 208 and the second side plate 210. The extended portion 212 overhangs or extends outwardly beyond the first side plate 208 and the second side plate 210 in the direction indicated by arrow 232 transverse to the transport direction 222. For example, the extended portion 212 may extend outward beyond a corresponding one of the first side plate 208 and the second plate in a direction defined by and/or approximately parallel to the rotation axis of one or more of the conveyor rollers 204. The extended portion 212 extends along the length of the corresponding one of the first side plate 208 and the second side plate 210. According to an embodiment, the extended portion 212 may extend beyond the length of the first side plate 208 and the second side plate 210. Further, each of the extended portions 212 includes arcuate sloped surfaces 214 integrally formed on opposite end portions 212a, 212b (not shown) of the extended portion 212 of the corresponding side plate 208, 210. For example, the opposite end portions 212a, 212b (not shown) of the extended portion 212 refers to parts located at opposite extreme ends along the longitudinal length of the extended portion 212, wherein each part is a mirror image of one another. In some examples, the arcuate sloped surface 214 is the mirror imaged part of the extended portion 212 at the opposite extreme end. The arcuate sloped surface 214 is downwardly bowed on the opposite end portions 212a, 212b (not shown) to define a curved head portion 212c and a curved tail portion 212d (not shown) for the extended portion 212 of both the side plates 208, 210.

According to an example embodiment, the curved head portion 212c extends downstream beyond the length of the first side plate 208 and the second side plate 210 in the transportation direction 222 and the curved tail portion 212d (not shown) extends beyond the length of the first side plate 208 and the second side plate 210 in the upstream direction 224. The term "arcuate sloped surface" is used herein to refer both curved head portion 212c and curved tail portion 212d of the extended portion 212 on both the first side plate 208 and the second side plate 212. The term "opposite end portions" of the conveyor rollers 204, the side plates 208, 210 and the extended portion 212 is used herein to refer to parts located at opposite extreme ends along a longitudinal length of the side plates 208, 210 and the extended portion 212, and along a transverse width of the conveyor rollers 204; wherein each part is a mirror image of one another.

In several example embodiments, braking mechanisms are generally placed internally in the cartridge frame 202 of the conveyor cartridge 106 in between the first side plate 208 and the second side plate 210. The braking mechanisms abut the conveyor rollers 204 to retard rotation of the conveyor rollers 204. In the example embodiment of FIG. 2, one type of braking mechanism 150 which is specifically positioned internal to the conveyor rollers 204 of the conveyor cartridge 106 is shown. In some example embodiments, the braking mechanism 150 is provided in at least one, but preferably each of the conveyor rollers 204. Alternatively or additionally, however, arrangements where the braking mechanism 150 is provided in at least two (or more) rollers from among the plurality of rollers. For example, one braking mechanism may be attached to an end idler roller at the upstream end and the other braking mechanism may be attached to the end idler roller at the downstream end.

In the braking mechanism 150 provided in FIG. 2, the braking mechanism 150 is attached internally to the conveyor rollers 204. Braking mechanism 150 may be affixed to the axles 204a of each conveyor roller 204 of the conveyor cartridge 106 or, in some examples, the braking mechanism 150 may be positioned inside the conveyor rollers 204 with or without contacting the axles 204a of the conveyor rollers 204.

FIG. 2 illustrates an inner circumferential portion 250a, which, in some examples, is the inner cylindrical cavity of the conveyor rollers 204 through which the axles 204a are inserted. Braking mechanism 150 may contact an inner circumferential portion 250a of the conveyor roller 204 to retard the rotation of the conveyor roller 204. In this regard, the articles travelling on the conveyor cartridge 106 may be stopped in an instance in which the braking mechanism 150 engages with their corresponding conveyor rollers 204 to stop the rotation of the conveyor rollers 204. The braking mechanism 150 arrests the rotation of the conveyor rollers 204, which in turn arrests the motion of the belt 105 reeved around these conveyor rollers 204.

Figure 3A:
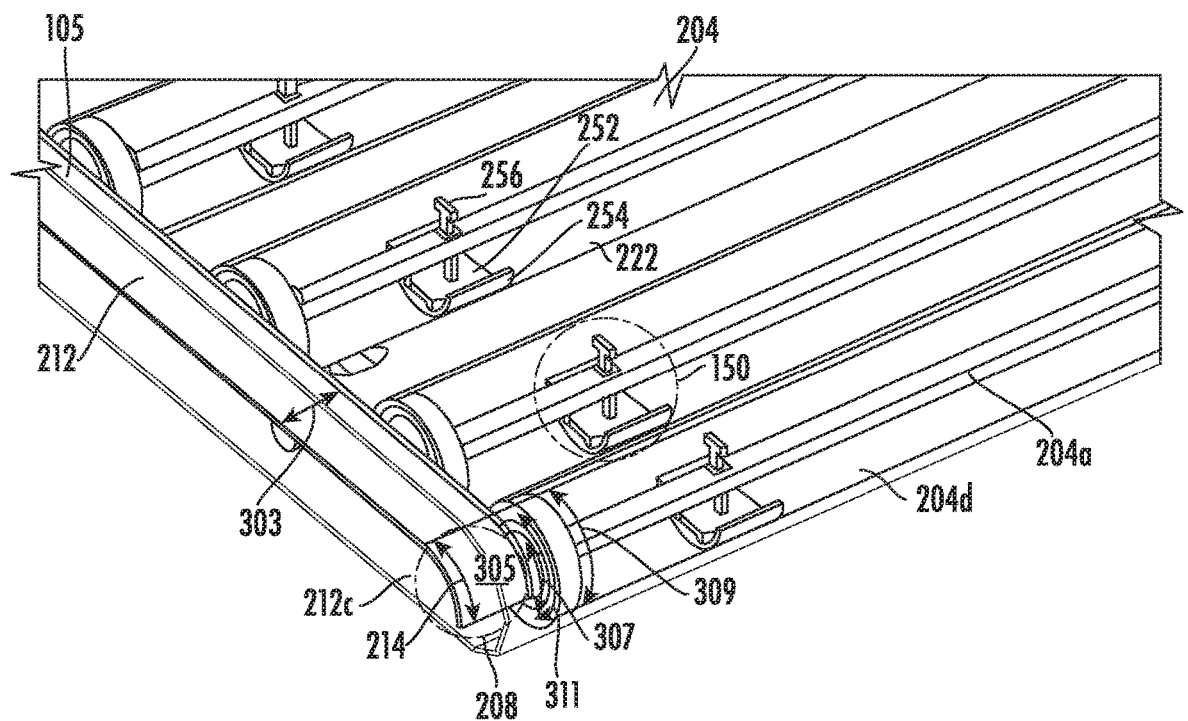
FIG. 3A illustrates a perspective view of an extended portion of a conveyor cartridge, in accordance with one or more embodiments of the present disclosure.

FIG. 3A illustrates a perspective view of an extended portion of the conveyor cartridge with braking mechanism of FIG. 2, in accordance with one or more example embodiments of the present disclosure. In FIG. 3A, the arcuate sloped surface 214, which forms a curved head portion 212c at the downstream end of the extended portion 212, is shown along with the first side plate 208. It will be understood that curved tail portion 212d (not shown) of the extended portion 212 is a mirror imaged part of the curved head portion 212c. As seen in FIG. 3A, the belt 105 is slid over the conveyor rollers 204 covering a full width of the conveyor rollers 204 and extending beyond the full width of the conveyor rollers 204 to cover the extended portion 212 of the first side plate 208. According to the example embodiment of FIG. 3A, the belt 105 partially covers a width 303 of the extended portion 212. Alternatively or additionally, the belt 105 may fully cover the width 303 of the extended portion 212.

According to an embodiment, the arcuate sloped surface 214 forming the curved head portion 212c includes a curved dimension (indicated by arrows) 305 that is substantially equal to the curved dimension indicated by arrows 307 of the curved outer periphery 208d of the first side plate 208. According to another example embodiment, the arcuate sloped surface 214 forming the curved head portion 212c includes a curved dimension 305 substantially equal to one half of the outer radial circumference 309 of an end conveyor roller 204d. For example, the arcuate sloped surface 214 may be defined by a radius of curvature that is equal to an outer radius of the end conveyor roller 204d (e.g., the largest radius of the roller of the end conveyor roller 204d). According to yet another example embodiment, the arcuate sloped surface 214 forming the curved head portion 212c includes a curved dimension 305 that is substantially equal to one half of the inner radial circumference 311 of the end conveyor roller 204d. For example, the arcuate sloped surface 214 may be defined by a radius of curvature that is equal to the inner radius of the end conveyor roller 204d (e.g., the smallest radius of the roller of the end conveyor roller 204d).

FIG. 3A illustrates a first example of braking mechanism 150, which, in this example comprises first set of magnets 252, brake pad 254, brake pad shaft 256 and spring 258 (not shown). As is shown, the first set of magnets 252 is attached to the brake pad 254. Each of the first set of magnets 252 is attached to the brake pad 254 using fasteners, such as, but not limited to, nuts, bolts, screw, glue or resin, or by friction fit.

In an example embodiment, the brake pad 254 may be made of a material which is attracted towards the first set of magnets 252 and is held in place as a result of the attractive force of the first set of magnets 252. The brake pad 254, for example, is made of an elastomeric material such as rubber or polyurethane pads. Alternatively or additionally, the brake pad 254 may be a plastic material.

In some examples, the brake pad shaft 256 is drilled through the axles 204a of the conveyor rollers 204 and fixed in the axles 204a with a clearance that supports vertical movement of the brake pad shaft 256. One end of the brake pad shaft 256 is attached to the brake pad 254 and the first set of magnets 252 while the other end is free and wound over by the spring 258 as seen in FIG. 3B.

Figure 3B:
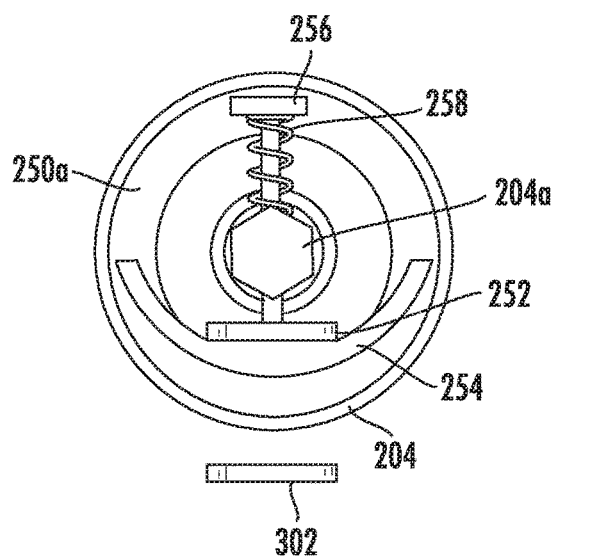
FIGS. 3B and 3C illustrate a cross sectional view of an inner circumferential portion of a conveyor roller of the conveyor cartridge as shown in FIG. 3A, in accordance with one or more embodiments of the present disclosure.
Figure 3C:
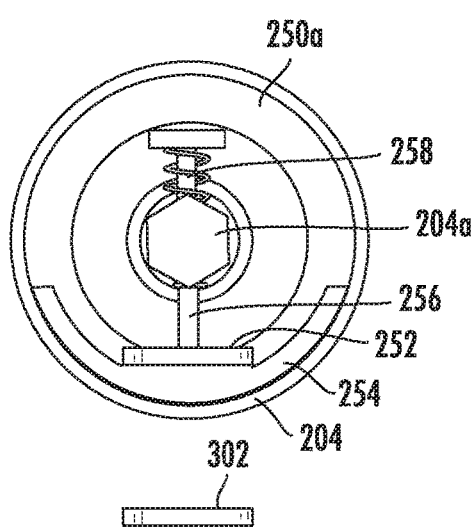

FIGS. 3B and 3C illustrate a cross sectional view of an inner circumferential portion of a conveyor roller 204 of the conveyor cartridge 106, in accordance with one or more example embodiments of the present disclosure. FIGS. 3B and 3C illustrate second set of magnets 302 that is placed outside of the conveyor roller 204 on a conveyor frame 102 and the first set of magnets 252 is placed inside the conveyor roller 204. In some examples, the first set of magnets 252 and the second set of magnets 302 have the same polarity. In operation and in some example embodiments, springs 258 deform their shape in an instance in which the brake pad 254, having the first set of magnets 252, is moved towards and away from the inner circumferential portion 250a of the conveyor roller 204. The deformation of the spring 258 is caused due to the attractive and repulsive force exerted by the first set of magnets 252 and the second set of magnets 302. For example, the repulsive force between the first set of magnets 252 and the second set of magnets 302 of same polarity may cause the brake pad 254 to move away and out of contact from the inner circumferential portion 250a of the conveyor roller 204 and removal of such repulsive force may cause the brake pad 254 to move towards and in contact with the inner circumferential portion 250a of the conveyor roller 204. When the brake pad 254 is out of contact with the inner circumferential portion 250a of the conveyor roller 204, the rotation of the conveyor roller 204 is not suspended. When the brake pad 254 is in contact with the inner circumferential portion 250a of the conveyor roller 204, the rotation of the conveyor roller 204 is suspended as brake pad 254 presses against the conveyor roller 204 to supply a force that retards the rotation. A detailed description of the braking of the conveyor rollers 204 caused due to the attractive and repulsive force exerted by the first set of magnets 252 and the second set of magnets 302 of the braking mechanism 150 is provided in conjunction with FIG. 3D.

Figure 3D:
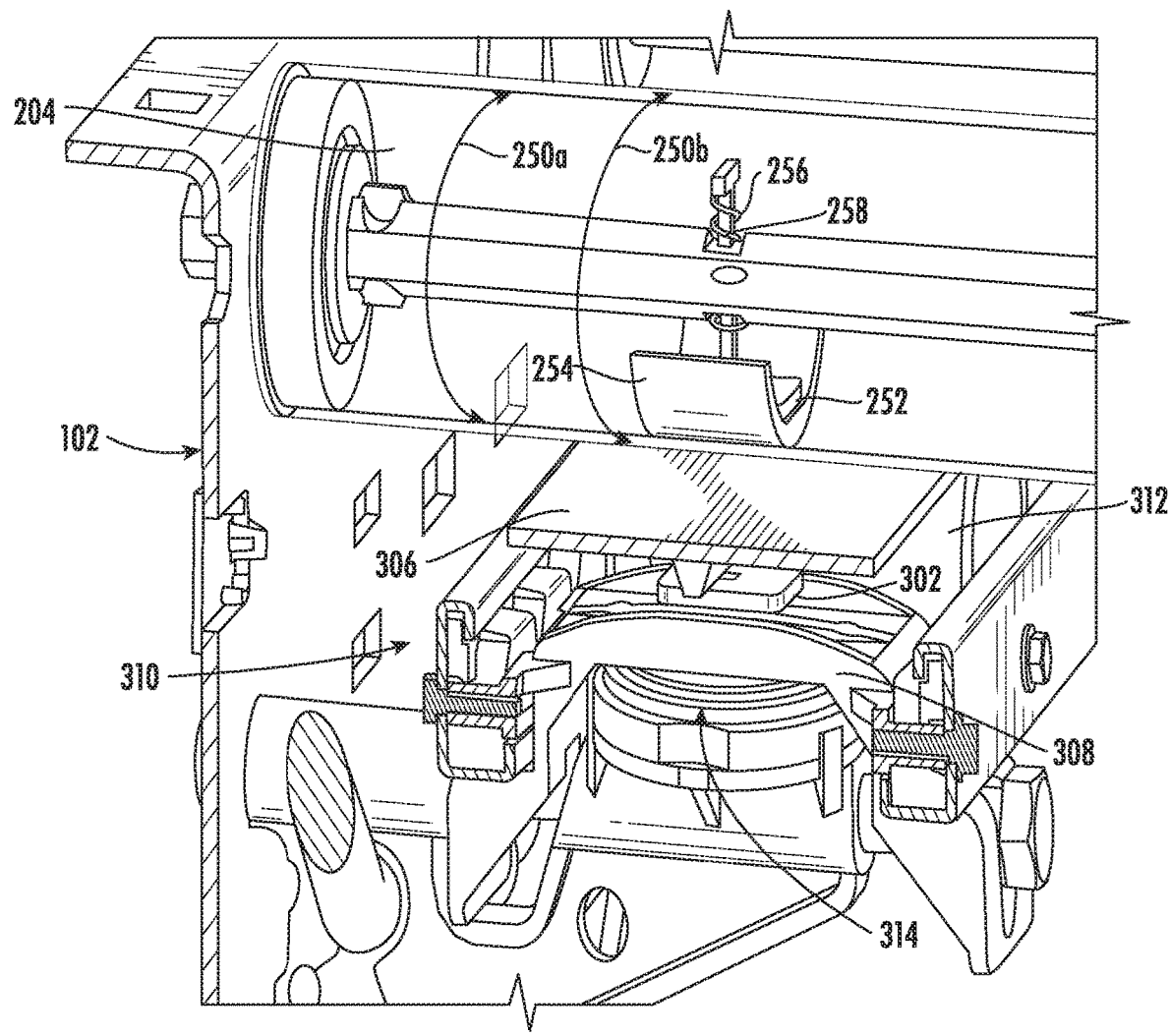
FIG. 3D illustrates an example of the conveyor cartridge of FIG. 3A installed in a conveyor system with conveyor drive belt, in accordance with one or more embodiments of the present disclosure.

FIG. 3D illustrates an example of conveyor cartridge installed in a conveyor system with conveyor drive belt, in accordance with one or more embodiments of the present disclosure. As seen FIG. 3D, a front cross sectional view of the conveyor frame 102 with one of the conveyor roller 204 having the braking mechanism 150 is depicted. The conveyor system 100 further includes a drive belt 306, a magnet mount 308 with the second set of magnets 302 attached to the brake pad 254 inside the conveyor roller 204, a shoe assembly 310 comprising pressure shoe rollers 312 and an actuating puck 314 to actuate the shoe assembly 310. Both the first set of magnets 252 and the second set of magnets 302 are positioned in such a manner that their like poles face each other respectively. The magnetic mount 308 is attached to the shoe assembly 310 using fasteners, such as, but not limited to, nuts, bolts, screw, glue or resin, by friction fit, and/or the like. In some example embodiments, the magnetic mount 308 may be an integral component of the shoe assembly 310 and may exist as a single unit attached to the conveyor frame 102. The drive belt 306 is positioned on the pressure shoe rollers 312 of the shoe assembly 310 and is held above the magnetic mount 308. The drive belt 306, for example, may drive the conveyor rollers 204 when in contact with the outer circumferential portion 250b of each of the conveyor roller 204.

In some example embodiments, the actuating puck 314, for example, may be an air diaphragm which is capable of inflating and deflating in response to a supply of air through the actuating puck 314. In operation and as a result of inflation and deflation, the actuating puck 314 moves the shoe assembly 310 along with the magnet mount 308 and the drive belt 306 towards and away from the conveyor rollers 204 of the conveyor cartridge 106 in a vertical direction. For example, when the second set of magnets 302 on the magnetic mount 308 is moved towards the conveyor roller 204 as a result of inflation of the actuating puck 314, the brake pad 254 is moved away from the inner circumferential portion 250a of the conveyor rollers 204 due to repulsive forces created by the like poles of first set of magnets 252 and the second set of magnets 302. The repulsive forces deform the springs 258 that are wound on the brake pad shafts 256 of all the conveyor rollers 204 (see e.g., FIG. 3B). Subsequently, when the actuating puck 314 is deflated, the magnetic mount 308 is moved away from the conveyor rollers 204 and the brake pad 254 of each conveyor roller 204 makes a contact with the inner circumferential portion 250a of the conveyor roller 204 due to removal of the repulsive forces created by the first set of magnets 252 and the second set of magnets 302. In this regard, the braking is accomplished when the drive belt 306 is moved out of contact with the conveyor roller 204 and the first set of magnets 252 contacts the conveyor roller 204 caused by the deflation of the actuating puck 314. Further, the conveyor roller 204 resumes its rotation when the drive belt 306 is moved in contact with the conveyor roller 204 and the first set of magnets 252 moves out of contact with the conveyor roller 204 caused by the inflation of the actuating puck 314.

Figure 4A:
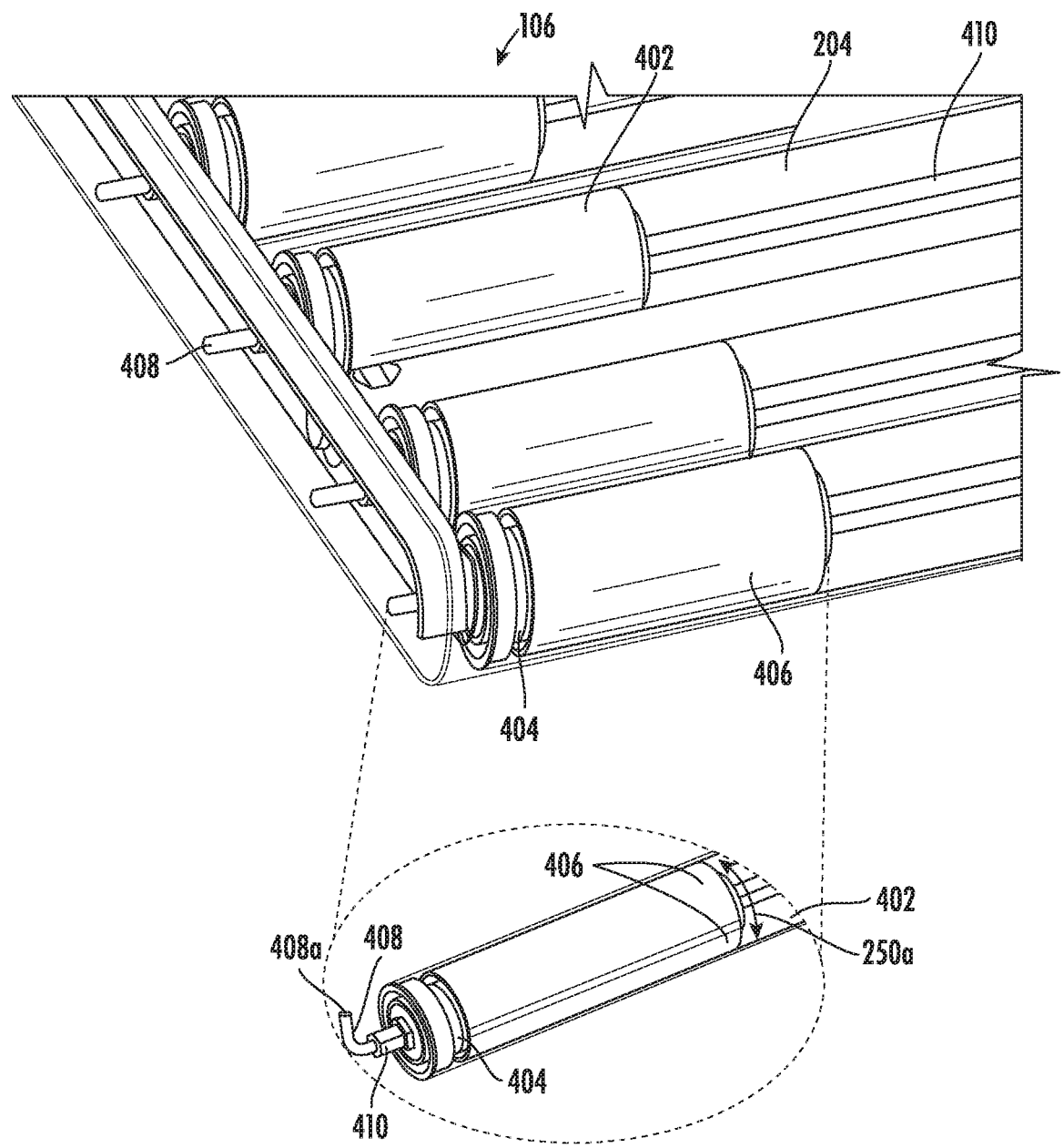
FIG. 4A illustrates another example braking mechanism used within a conveyor cartridge, in accordance with one or more embodiments of the present disclosure.
Figure 4B:
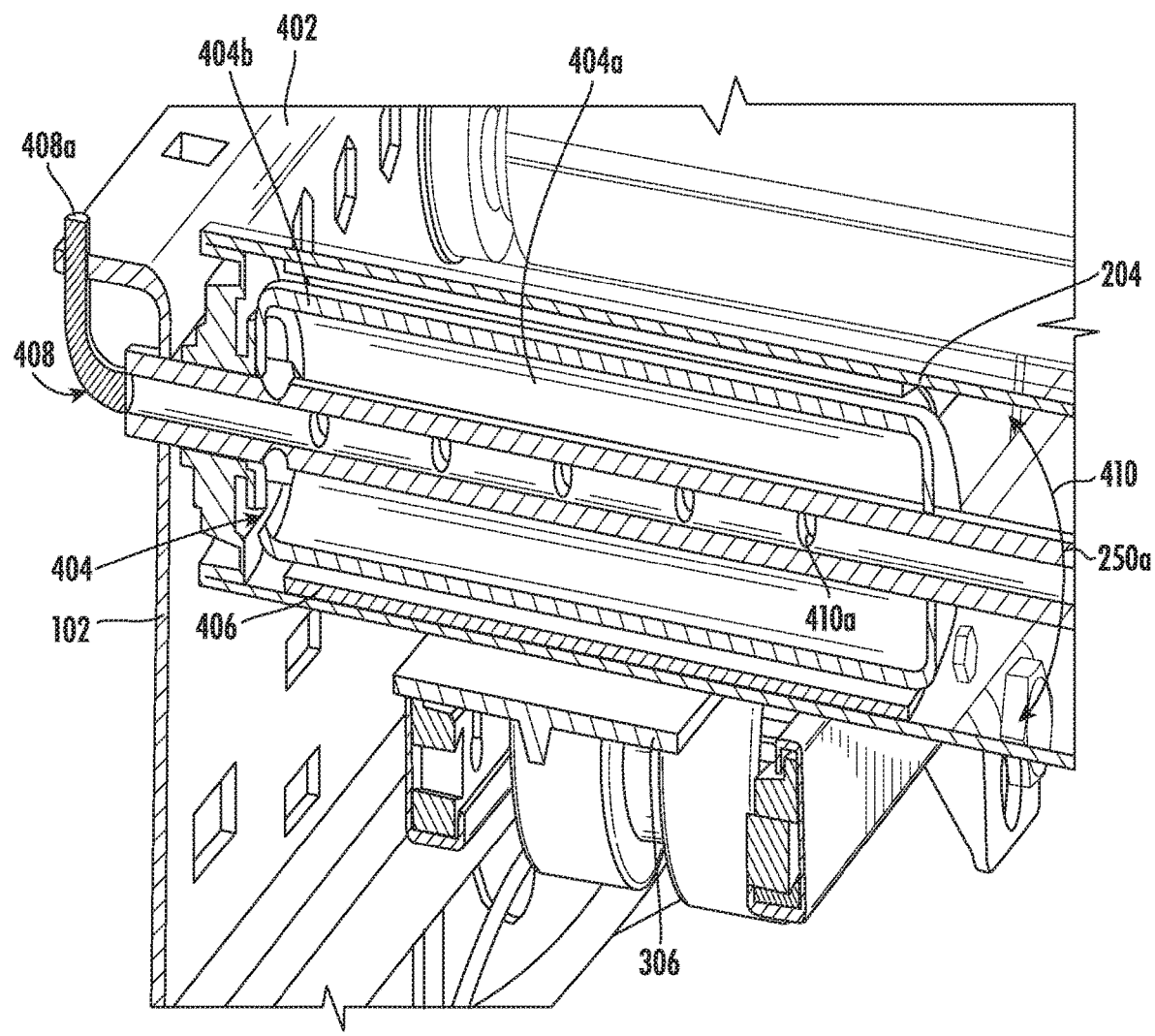
FIG. 4B illustrates a cross sectional view of an inner circumferential portion of a conveyor roller of the conveyor cartridge of FIG. 4A, in accordance with one or more embodiments of the present disclosure.

FIG. 4A illustrates an example of a braking mechanism 402 used within the conveyor cartridge 106, in accordance with one or more embodiments of the present disclosure. The braking mechanism 402, in an example embodiment, is positioned inside the conveyor roller 204 of the conveyor cartridge 106. The braking mechanism 402 includes a bladder 404, one or more brake plates 406, an air inlet valve 408 and an apertured axle 410 (as shown in FIG. 4B). In examples depicted in FIGS. 4A and 4B, a bladder 404 is used. In some examples, bladder 404 is made of rubber, however, the bladder 404 may be of any material capable of expanding and contracting in response to flow of air inside the bladder 404.

In some examples, bladder 404 is inflated when air is supplied through the air inlet valve 408 and deflated when the air is removed or otherwise cut-off. The air inlet valve 408 is drilled through the apertured axle 410 (as shown in FIG. 4B) of the conveyor roller 204 to supply air through a cavity existing inside the apertured axle 410 (as shown in FIG. 4B). Further, an inlet portion 408a of the air inlet valve 408 is protruded out from the first side plate 208 through one of the apertures 208a (as shown in FIG. 2) provided on the first side plate 208. An air supply valve (not shown) may be connected to the inlet portion 408a of the air inlet valve 408 to supply the air through the cavity of the apertured axle 410. Bladder 404 is positioned around the apertured axle 410 covering apertures 410a (as shown in FIG. 4B). One or more brake plates 406 are attached to an outer surface 404b (as shown in FIG. 4B) of the bladder 404.

In operation, bladder 404 expands in accordance with quantum of air, supplied via air inlet valve 408, gushing out through the apertures 410a of the axle 410. As bladder 404 expands, the brake plates 406 makes a contact with the inner circumferential portion 250a of the conveyor roller 204 and retards the rotation of the conveyor roller 204 facilitating braking of the articles travelling on the conveyor cartridge 106.

FIG. 4B illustrates a cross sectional view of an inner circumferential portion of a conveyor roller of the conveyor cartridge of FIG. 4A installed on the conveyor system with the conveyor drive belt 306, in accordance with one or more embodiments of the present disclosure. As seen in FIG. 4B, the braking mechanism 402 includes apertured axle 410 with one or more apertures 410a. The rubber bladder 404 is attached to the apertured axle 410, for example, through one or more fasteners, such as, but not limited to, nuts, bolts, screw, glue or resin, Velcro, by friction fit and/or the like.

The rubber bladder 404 is attached to the apertured axle 410 in such a manner so as to create a minimum vacuum between the apertured axle 410 and the rubber bladder 404 to facilitate air flow through the vacuum. The one or more brake plates 406 are shown affixed to the outer surface 404b of the bladder 404 through one or more fasteners, such as, but not limited to, nuts, bolts, screw, glue or resin, Velcro or by friction fit and/or the like. In. FIG. 4B, the rubber bladder 404 is shown to be inflated and the brake plates 406 contact the inner circumferential surface 250a of the conveyor roller 204.

In operation, air is supplied through the inlet portion 408a of the air inlet valve 408 and flows out of the one or more apertures 410a to the inner surface 404a of the rubber bladder 404. For example, the rubber bladder 404 deforms its shape in accordance with the air supply from the one or more apertures 410a of the apertured axle 410. The rubber bladder 404 inflates or expands when air flows through the one or more apertures 410a into to the vacuum that is defined by the rubber bladder 404 and the apertured axle 410. As the air is filled in the vacuum, the rubber bladder 404 slowly inflates or expands up to a point where the one or more brake plates 406 contact the inner circumferential portion 250a of the conveyor roller 204.

Further, when the air supply is suspended to the air inlet valve 408, the rubber bladder 404 slowly deflates or contracts. Thereby, the brake plates 406 are also released from contact with the inner circumferential portion 250a of the conveyor roller 204 allowing the conveyor roller 204 to continue its rotation. Therefore inflation and deflation of the bladder 404 due to supply of the air results in the braking of the conveyor rollers 204 through force exerted by the one or more brake plates 406 against the rotation of the conveyor rollers 204.

FIG. 5A illustrates an example of another type of braking mechanism used within the conveyor cartridge of FIG. 2, in accordance with one or more embodiments of the present disclosure. In FIGS. 5A and 5B, a braking mechanism 502 is positioned internally on the conveyor roller 204 of the conveyor cartridge 106. The braking mechanism 502 includes an air inlet valve 504, an air diaphragm 506, cone brake 508, a bearing 510, and a bearing housing 512. The bearing housing 512 includes a first portion 512a and a second portion 512b. The first portion 512a is in contact with the inner circumferential portion 250a of the conveyor roller 204 by means of an interference fit, press fit, friction fit and/or the like. The second portion 512b is out of contact with the inner circumferential portion 250a of the conveyor roller 204. The second portion 512b and the first portion 512a may exist as a single unit and therefore may be installed with a clearance with the axles 204a of the conveyor roller 204 to support a rotation of the bearing housing 512 with respect to the axles 204a. For example, bearing housing 512 rotates along with the rotation of the conveyor roller 204. Alternatively or additionally, the second portion 512b and the first portion 512a may be independently installed.

In some example embodiments, air diaphragm 506 is attached to the first side plate 208 of the conveyor cartridge 106. The air diaphragm 506 is supported on the axle 204a and is placed adjacent to, but out of contact with the bearing housing 512. Further, the axle 204a includes a spring 514 which serves as a retention feature in all of the conveyor rollers 204 that allows the axle 204a to depress to either side of the conveyor roller 204 for ease of installation.

FIG. 5B illustrates the braking mechanism 502 of FIG. 5A shown in an exploded view, in accordance with one or more embodiments of the present disclosure. As illustrated in FIG. 5A, the bearing 510 is attached to the second portion 521b of the bearing housing 512 and rotates along with the bearing housing 512. For example, the bearing 510 may be molded or pressed as an interference fit with the second portion 512b.

The cone brake 508 is attached to the axle 204a of the conveyor roller 204, for example, the cone brake 508 may be attached to one end of the axle 240a and partially covered by the first portion 512a of the bearing housing 512. The cone brake 508 is attached to the axle 204a such that the cone brake 508 is free to slide axially along the axle 204a in a transverse direction indicated by "x" opposite to a direction of rotation "y" of the conveyor roller 204. The cone brake 508 and the bearing housing 512 is installed with a clearance such that the cone brake 508 does not rotate along with the bearing housing 512. In some examples, the cone brake 508 is sized or otherwise made to match the profile of the bearing housing 512.

In alternative or additional embodiments, other profiles for the cone brake 508 may be included. For example, other profiles for the cone brake may be a circular shape, semi-circular shape, square shape and their like. In some examples, the air diaphragm 506 is also made to match the profile of the cone brake 508.

Air diaphragm 506 includes the air inlet valve 504 through which the air supply is forced into the first portion 512a of bearing housing 512 covering the cone brake 508. The air diaphragm 506 may be partly supported on the axle 204a of the conveyor roller 204 and is capable of sliding axially along the axle 204a. The air diaphragm 506, the cone bake 508, the bearing housing 512 and/or the bearing 510 include through holes 520 through which the axle 204a of the conveyor roller 204 is inserted. The air diaphragm 506 and the cone brake 508 are slidably engaged with the axle 204a. The bearing housing 512 and the bearing 510 are engaged to the axle 204a with a clearance to enable free rotation of the bearing housing 512 along with the conveyor roller 204 about the axle 204a.

Cone brake 508, in some examples, may slide on the axle 204a from an initial rest position to a braking position in a direction indicated as "x". The cone brake 508 is free from contact with the bearing housing 512 at the initial rest position. The cone brake 508 slides on the axle 204a and contacts the bearing 514 provided on the second portion 512b of the bearing housing 512 at the braking position. When the air diaphragm 506 expands in response to the air supply, the air diaphragm 506 pushes the cone brake 508 from the initial rest position to the braking position and vice versa when the air diaphragm 506 contracts. For example, the air diaphragm 506 expands as a result of supply of the air from the air inlet valve 504.

The expansion of the air diaphragm 506 causes it to be forced against the cone brake 508 partially enclosed at a first portion 512a of the bearing housing 512. The cone brake 508, which is slidingly engaged with the axle 204a, moves axially with the force of the air diaphragm 506 and brushes against the bearing 510 held at the second portion 512b of the bearing housing 512. As a result of the cone brake 508 brushing against the bearing 510, the rotation of the bearing 510 and the bearing housing 512 is retarded, which in turn retards the rotation of the conveyor roller 204.

FIG. 6A illustrates an example of yet another type of braking mechanism shown in an exploded view and used within the conveyor cartridge of FIG. 2, in accordance with one or more embodiments of the present disclosure. The braking mechanism 602 includes an arm 604, an isolation plate 606, an actuator base 608, and one or more actuators 610. The arm 604 further includes a support rod 604a, a brake pad 604b and two wings, a first wing 604c and second wing 604d. One end of first wing 604c is attached to the brake pad 604b and one end of the second wing 604d is positioned above the isolation plate 606 with a clearance therebetween. The opposite end of the first wing 604c and the second wing 604d is attached to a through hole portion 604e of the arm 604. The support rod 604a is inserted into the through hole 604e provided in the arm 604 centered between the two wings 604c, 604d. End portions 605 of the support rod 604a are supported on one or more apertures 208a, 210a provided on the first side plate 208 and the second side plate 210 respectively with a clearance to facilitate a rotation of the support rod 604a.

In some examples, the support rod 604a supports pivotal motion or rocking motion or back-and forth motion of the arm 604. For example, the first wing 604c experiences a rocking motion facilitate by the support rod 604a such that the brake pad 604b, which is positioned on one end of the first wing 604c, touches a conveyor roller 204 to retard the rotation of the conveyor roller 204.

One or more actuators 610 are positioned on the actuator base 608. The actuator base 608 extends a conveyor cartridge width from the first side plate 208 to the second side plate 210. The one or more actuators 610 may be actuated using, for example, an external air supply (not shown). In some examples, the one or more actuators 610 may be electrical actuators.

Isolation plate 606 is provided on top of the one or more actuators 610. The isolation plate 606 is used for protecting, in some examples, the one or more actuators 610 from any damage or wear. For example, the one or more actuators 610 may include air diaphragm that is made of rubber like material that may inflate and deflate in response to supply of the air. Isolation plate 606 is provided, in some examples to secure the one or more actuators 610 from the contact of the arm 604.

In some examples, the arm 604 may be made of a steel material. Alternatively or additionally, arm 604 may be made of a soft material which may not cause any wear when contacted against the material of the one or more actuators 610. In such examples, braking mechanism 602 may include an arm 604, an actuator base 608 and one or more actuators 610.

Figure 6B:
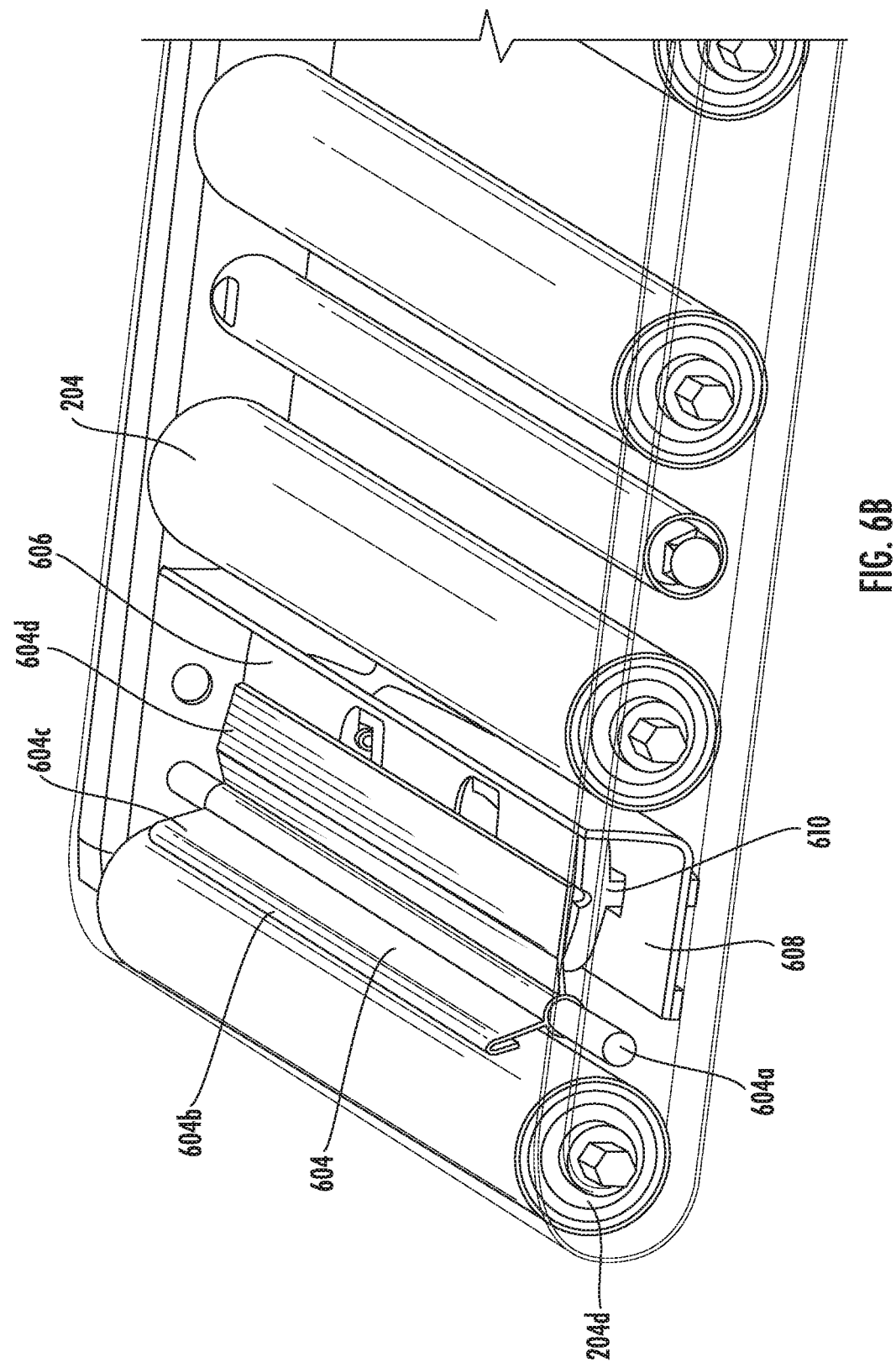
FIG. 6B illustrates the conveyor cartridge of FIG. 2 with braking mechanism of FIG. 6A, in accordance with one or more embodiments of the present disclosure.

FIG. 6B illustrates the conveyor cartridge of FIG. 2 with braking mechanism of FIG. 6A, in accordance with one or more embodiments of the present disclosure. In some example embodiments, the braking mechanism 602 is positioned adjacent to one or more conveyor rollers 204 within the conveyor cartridge 106. As seen in FIG. 6B, the braking mechanism 602 is placed adjacent to an end conveyor roller 204d. Alternatively or additionally and in some examples, other arrangements of placing the braking mechanism 602 adjacent to one or more of the conveyor rollers 204 of the conveyor cartridge 106 are contemplated.

As shown in FIG. 6B, the first and the second wings 604c, 604d are arranged in the form of a seesaw with support rod 604a centered therebetween to provide a seesaw motion or a rocking motion to pivotal motion to the wings 604c, 604d. In such an arrangement, wings 604c, 604d are capable of moving from a rest position to a braking position.

In operation, the one or more actuators 610, when actuated by the external air supply may inflate and lift the isolation plate 606 from its original position in a vertical direction. The isolation plate 606 moves up the clearance and contacts with the second wing 604d positioned above the isolation plate 606. Once the isolation plate 606 lifts up and pushes the second wing 604d, the arm 604 pivots or rocks under an influence of the support rod 604a. This pivotal or rocking motion enables the first wing 604c attached to the second wing 604d to contact the end conveyor roller 204d. For example, the arm 604 undergoes a seesaw motion in response to the second wing 604d being pushed by the isolation plate 606. The brake pad 604b on the first wing 604c provides a pressing contact with the end conveyor roller 204d stopping the rotation of the roller 204d. Further, when the one or actuators 610 are deflated by suspending the supply of air, the isolating plate 606 returns back to its original position and both the wings 604c, 604d pivot back to the rest position with help of the support rod 604a. As a result, the brake pad 604b is also released from contact with the end conveyor roller 204d such that the roller 204d starts rotation.

Therefore and as described herein, when an article needs to stopped at particular zone, a photo eye may detect the presence of the article at that particular zone and may send signals to a controller. As a result, the controller may then activate any or all of the braking mechanisms of the conveyor cartridge of that particular zone, which results in retardation of rotation of the conveyor rollers of that particular zone. In this manner, the braking mechanism provides required braking to retard the rotation of the conveyor roller and stops the article in any selected zone or zones of the conveyor system.

In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements are equally contemplated by the present disclosure.

The invention claimed is:

1. A conveyor system comprising:
a conveyor frame with a first side rail and a second side rail; and
a conveyor cartridge removably coupled with the first side rail and the second side rail of the conveyor frame, wherein the conveyor cartridge comprises:
a cartridge frame comprising:
a first side plate and an opposite second side plate that delimit a direction of the conveyor cartridge transverse to a transport direction;
a conveyor roller rotatably mounted to an axle and extending a conveyor roller width between the first side plate and the opposite second side plate; and
a braking mechanism positioned internally in the cartridge frame between the first side plate and the opposite second side plate, the braking mechanism comprises a brake pad, a first magnet and a second magnet, wherein the first magnet is attached to the brake pad and the second magnet is attached to a magnet mount, and wherein a magnetic force between the first magnet and the second magnet causes the brake pad to abut the conveyor roller and retard rotation of the conveyor roller.

2. The conveyor system of claim 1, wherein the cartridge frame further comprises:
extended portions, each of the extended portion integrally formed on a top surface of one of the first side plate or the opposite second side plate;
arcuate sloped surfaces integrally formed on opposite end portions of each of the extended portions, wherein the arcuate sloped surfaces are downwardly bowed on the opposite end portions to define a curved head portion and a curved tail portion for the extended portions; and
a belt slidably engaged to the cartridge frame fully covering the conveyor roller and the braking mechanism and extending beyond the conveyor roller to cover at least a portion of each of the extended portions.

3. The conveyor system of claim 1, wherein the braking mechanism further comprises a bladder and brake plates.

4. The conveyor system of claim 1, wherein the braking mechanism further comprises air diaphragms, cone brakes, and bearings.

5. The conveyor system of claim 1, wherein the braking mechanism further comprises an arm, a support rod, and the brake pad with wings.

6. A conveyor cartridge comprising:
a cartridge frame;
a first side plate and an opposite second side plate that delimit a direction of the conveyor cartridge transverse to a transport direction; and
a braking mechanism positioned internally in the cartridge frame in between the first side plate and the opposite second side plate, the braking mechanism comprises a brake pad, a first magnet and a second magnet, wherein the first magnet is attached to the brake pad and the second magnet is attached to a magnet mount, and wherein a magnetic force between the first magnet and the second magnet causes the brake pad to abut a conveyor roller and retard rotation of the conveyor roller.

7. The conveyor cartridge of claim 6, wherein the braking mechanism further comprises a brake pad shaft and a spring.

8. The conveyor cartridge of claim 7, further comprising:
extended portions, each of the extended portion integrally formed on a top surface of one of the first side plate or the opposite second side plate;
arcuate sloped surfaces integrally formed on opposite end portions of each of the extended portions; and
a belt slidably engaged to the cartridge frame, wherein the belt covers the conveyor roller, the braking mechanism and at least a portion of each of the extended portions.

9. The conveyor cartridge of claim 7, further comprising:
a magnet mount attached to a conveyor frame comprising a second set of magnets with like polarity as that of a first set of magnets, wherein the conveyor frame has a first side rail and a second side rail and the conveyor cartridge is removably coupled with the first side rail and the second side rail of the conveyor frame; and
an actuating puck to lift the magnet mount in a vertical direction towards and away from the conveyor cartridge.

10. The conveyor cartridge of claim 9, wherein the brake pad shaft is coupled an axle of the conveyor roller, and the spring is wound over the brake pad shaft.

11. The conveyor cartridge of claim 9, wherein the actuating puck is an air diaphragm.

12. The conveyor cartridge of claim 9, wherein when the actuating puck is deflated, the magnet mount is moved away from the conveyor roller and the brake pad of the conveyor roller makes a contact with an inner circumferential portion of the conveyor roller.

13. The conveyor cartridge of claim 6, wherein the braking mechanism comprises an air inlet valve, an air diaphragm, a cone brake, a bearing, and a bearing housing.

14. The conveyor cartridge of claim 13, wherein the bearing housing comprises a first portion and a second portion and is installed with a clearance with respect to an axle of the conveyor roller, and wherein the second portion holds the bearing.

15. The conveyor cartridge of claim 13, wherein the cone brake is attached to an axle of the conveyor roller such that the cone brake slides axially along the axle in a direction "x" transverse to a direction of rotation "y" of the conveyor roller.

16. The conveyor cartridge of claim 13, wherein the cone brake slides on an axle from an initial rest position to a braking position in a direction "x", wherein at the initial rest position, the cone brake is free from contact with the bearing housing, and wherein at the braking position, the cone brake contacts the bearing provided on the bearing housing.

17. The conveyor cartridge of claim 6, wherein the braking mechanism comprises a bladder, one or more brake plates, an air inlet valve, and an apertured axle.

18. The conveyor cartridge of claim 17, wherein the apertured axle includes one or more apertures, wherein the bladder inflates when air flows through the one or more apertures into a vacuum that is defined by the bladder and the apertured axle.

19. The conveyor cartridge of claim 17, wherein the one or more brake plates contact an inner circumferential portion of the conveyor roller in response to an inflation of the bladder.

20. The conveyor cartridge of claim 6, wherein the braking mechanism further comprises an arm, an isolation plate, an actuator base and one or more actuators, wherein the arm comprises a support rod, the brake pad, a first wing, and a second wing.

21. The conveyor cartridge of claim 20, wherein one end of the first wing is attached to the brake pad and one end of the second wing is positioned above the isolation plate.

22. The conveyor cartridge of claim 21, wherein the support rod is inserted into a through hole provided in the arm centered between the first wing and the second wing.

23. The conveyor cartridge of claim 20, wherein the one or more actuators is positioned on the actuator base, and wherein the actuator base extends a conveyor cartridge width from the first side plate to the opposite second side plate.

24. The conveyor cartridge of claim 20, wherein the first wing and the second wing are arranged in the form of a seesaw with the support rod centered therebetween.

25. The conveyor cartridge of claim 20, wherein the one or more actuators inflate and lift the isolation plate from an original position in a vertical direction such that the isolation plate contacts the second wing.

26. The conveyor cartridge of claim 25, wherein the brake pad on the first wing provides a pressing contact with the conveyor roller to stop rotation of the conveyor roller.

27. A conveyor cartridge removably coupled with a first side rail and a second side rail of a conveyor frame, wherein the conveyor cartridge comprises:
a cartridge frame;
a conveyor roller rotatably mounted to an axle and extending a conveyor roller width between a first side plate and a second side plate; and
a braking mechanism positioned internally in the cartridge frame in between a plurality of conveyor rollers, the braking mechanism comprises a brake pad, a first magnet and a second magnet, wherein the first magnet is attached to the brake pad and the second magnet is attached to a magnet mount, and wherein a magnetic force between the first magnet and the second magnet causes the brake pad to abut the conveyor roller and retard rotation of the conveyor roller.

* * * * *